United States Patent [19]

Mott

[11] Patent Number: 4,516,965
[45] Date of Patent: May 14, 1985

[54] POWER TRANSMISSION CHAIN-BELT
[75] Inventor: Philip J. Mott, Des Plaines, Ill.
[73] Assignee: Borg-Warner Corporation, Chicago, Ill.
[21] Appl. No.: 497,480
[22] Filed: May 23, 1983
[51] Int. Cl.³ .............................. F16G 5/18
[52] U.S. Cl. ............................ 474/245; 474/201
[58] Field of Search ............... 474/240, 242, 244, 245, 474/248, 265, 270, 229, 201

[56] References Cited
U.S. PATENT DOCUMENTS

| 4,313,730 | 2/1982 | Cole et al. | 474/201 |
| 4,344,761 | 8/1982 | Steuer | 474/245 |
| 4,386,922 | 6/1983 | Ivey | 474/242 |

Primary Examiner—James A. Leppink
Assistant Examiner—Thuy M. Bui
Attorney, Agent, or Firm—Aubrey L. Burgess

[57] ABSTRACT

A power transmission chain-belt, especially adapted to transmit power between the pulleys of a pulley transmission, such as a variable ratio pulley transmission. The chain-belt is constructed of a plurality of ranks or sets of interleaved links, each rank being joined to the next adjacent rank by pivot means, such as round pins, or a pin and rocker, to permit articulation of the belt. Trapezoidal load blocks carried by the chain have angled edge surfaces to drivingly contact the flanges of the pulleys. In one embodiment of the invention, a block is located between each adjacent pair of pivot means and at least one block has a different width than the other load blocks, so that its edges are free of contact with the flanges of the pulleys and thus do not drivingly engage the flanges.

Substantially the same effect is achieved by "skipping" one or more load blocks in the assembly, i.e. by eliminating one or more load blocks in the chain-belt. These arrangements change the generated noise pattern produced when the chain-belt engages the pulley flanges.

6 Claims, 5 Drawing Figures

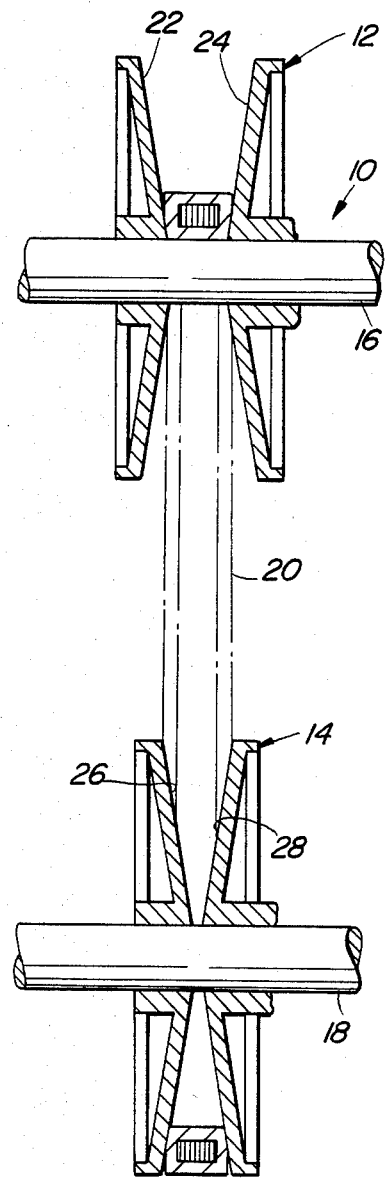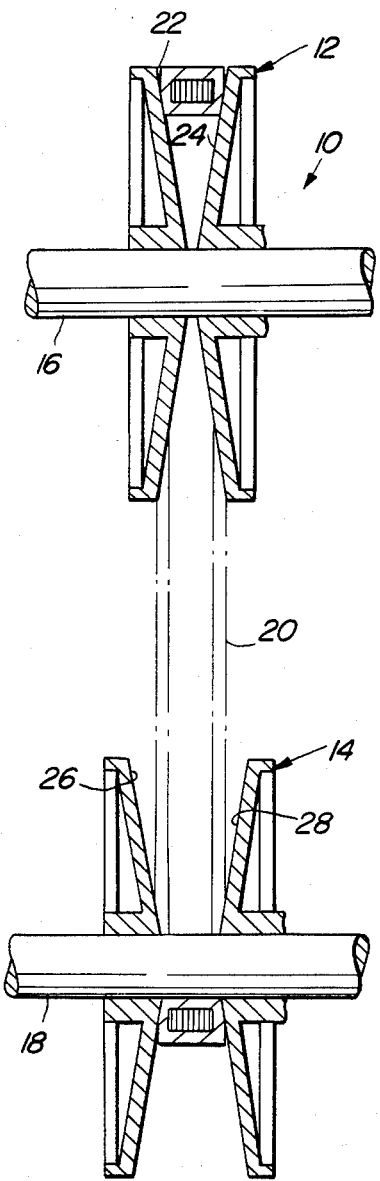

POWER TRANSMISSION CHAIN-BELT

BACKGROUND OF THE INVENTION

Variable pulley transmissions for transferring torque from an input shaft to an output shaft have been used for some time. In such arrangements a first pulley is mounted on the input shaft, and this pulley has at least one flange axially movable relative to its other flange to change the effective pulley diameter. A second, similarly adjustable pulley is mounted on the output shaft. A flexible belt intercouples the two pulleys to transfer torque between them. As the effective diameter of one pulley is changed, and simultaneously the effective diameter of the other pulley is changed in the opposite direction, the drive ratio between the input and output shafts is adjusted in a smooth, continuous manner.

For over 30 years automotive engineers have recognized that the maximum operating efficiency of the engine could be achieved if the transmission could be controlled by adjusting to different loads and speed ratios such that the engine is maintained at its maximum efficiency point. This is not possible with a conventional geared transmission in which the drive ratio is adjusted in discrete steps, rather than continuously. Accordingly, efforts have been directed to the use of a continuously variable transmission of the type described above. This has resulted in the production and marketing in Europe of the Daf passenger car, using a flexible rubber belt in such a continuously variable transmission (CVT). Such a belt must be relatively wide because of the torque it must handle, and operates under severe temperature, vibration and other adverse conditions. Accordingly, efforts have been channeled to produce a flexible belt of metal, and some of these efforts are described in the patent literature. Such belts can be relatively narrow and possess more load-torque handling capacity than a rubber belt of the same cross-section and, in addition, provide greater efficiency in transmitting torque between the pulleys of the transmission.

A chain-belt for a pulley transmission comprising ranks or sets of links interleaved with other sets of links and connected by pivot means, and drive or load blocks of generally trapezoidal shape located between adjacent pivot pins to transmit load to the pins, is disclosed and claimed in U.S. Pat. No. 4,313,730, issued Feb. 2, 1982 to Cole et al. In this patent, the drive or load blocks have a centrally located "window" through which links of the chain pass, and angled side edges which drivingly engage the pulley flanges. This belt is of the "pull" or tension type because the drive or load blocks do not move longitudinally along the chain but are constrained by the pivot means.

Another type of metal drive belt for a pulley transmission is taught in U.S. Pat. No. 3,720,113. This belt comprises a flexible band of superimposed, nested steel strips with metal blocks longitudinally movable thereon. Each of the blocks has tapered edges to engage the flanges of the pulleys of the transmission. Because the metal blocks abut each other and are under compression when torque is transferred, the belt is classified as a "push" or compression type. The projected cost of the described "push" type belts is several times the cost of a "pull" chain-belt as taught by Cole et al. Thus, economically, the Cole et al chain-belt is much more attractive than the belt of U.S. Pat. No. 3,720,113.

One major factor to be considered in using the CVT for automotive use is the noise generated by the engagement of drive blocks and pulley flanges. Noise which "peaks" at certain frequencies in a regular pattern can be disagreeable and annoying to humans. Acoustic research results have proven that a white, irregular or arrythmic noise is less noticeable and annoying than a noise which contains recognizable pure tones or a single frequency signal. The most annoying chain noise is the single tone or frequency which may occur above 100 Hz, and has an amplitude extending above the average amplitude by 5 to 10 dB. Some of the prior art chain-belts described may produce a noise spectrum including signals which are annoying to humans.

SUMMARY OF THE INVENTION

The present invention is useful in a chain-belt for drivingly interconnecting the pulleys of a pulley transmission. The pulleys of such a transmission are constructed of a pair of flanges and, in a CVT, at least one flange of a pair is axially movable with respect to one another. The endless chain-belt is constructed of a plurality of ranks or sets of links interleaved with adjacent sets of links, a rank or set of links being a transverse group of links between and encompassing two adjacent pivot means. Each link has a pair of openings, one adjacent each end of the link. The openings at one end of a set of links are aligned with the openings at an end of the next adjacent set of links. Pivot means pass through the aligned openings to join the sets of links and to permit articulation of the assembly. The pivot means can comprise round pins, or sets of pins and rockers, both types of pivot means being well known in the art.

In accordance with the present invention, trapezoidal drive or load blocks having side edges proportioned to drivingly contact the pulley flanges are located on some ranks of links between adjacent pivot means, while other ranks of links are free of load blocks. In the alternative load blocks can be located on all ranks of links between adjacent pivot means, and then at least one load block in the assembly is intentionally modified, as by having its side edges ground off, so that no part of the modified load block can drivingly contact the pulley flanges. The number of "skipped" blocks or modified no-contact blocks is usually less than the number of flange-engaging and driving load blocks in the endless chain-belt. Each drive or load block has a centrally located window through which links pass. Each block can be a single member or a laminate, made up of several relatively thin parts. In the latter, the parts can be stamped from sheet metal and require little, if any, finishing. A single block member can be machined from metal stock or produced by powdered metal forming techniques.

Generally, several drive blocks of different widths are used and arranged in a random or a predetermined pattern in the drive belt, or several blocks are omitted, also in a random or predetermined pattern. "Width" means the block dimension measure from side to side, or from the flange-engaging surface on one side of the block to the flange-engaging surface on the other side of the block.

The operational noise pattern generated by a chain-belt constructed according to this invention and used in a pulley transmission results in an acoustically acceptable chain-belt for use in the automotive industry.

BRIEF DESCRIPTION OF THE DRAWINGS

FIGS. 1 and 2 are schematic illustrations of a variable pulley transmission in different drive ratios;

DETAILED DESCRIPTION OF THE PREFERRED EMBODIMENT

Figure 3:
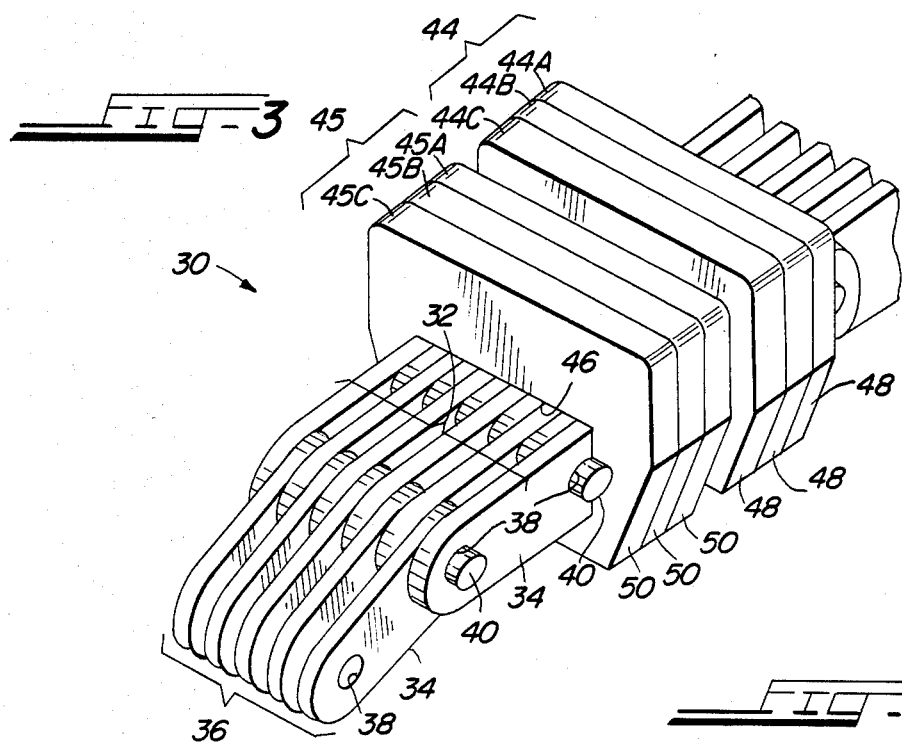
FIG. 3 is an isometric illustration of a portion of one form of chain-belt constructed according to this invention.

FIGS. 1 and 2 illustrate schematically a variable pulley transmission 10 comprising a pair of spaced pulleys 12 and 14 mounted on generally parallel shafts 16 and 18. The pulleys 12 are interconnected by an endless transmission belt 20. Pulley 12 comprises pulley flanges 22 and 24 and pulley 14 comprises pulley flanges 26 and 28. At least one flange of each pulley is axially movable with respect to the other to vary the drive ratio between pulley 12 and 14. FIGS. 1 and 2 illustrate the extremes of drive ratios between the pulleys. One or the other of the shafts can be designated as the drive shaft and connected to a source of power (not shown); the other shaft is designated as the driven shaft and is connected to the load which is driven, as for example, the wheels of an automobile (not shown).

Drive-chain or chain-belt 30 of this invention, a portion of which is illustrated in FIG. 3, is connected in an endless loop of a length suitable to drivingly interconnect pulleys 12 and 14 of a variable pulley transmission, as schematically illustrated in FIGS. 1 and 2, it being understood that chain-belt 30 can be used to drivingly interconnect pulleys in any pulley transmission system if so desired.

The drive chain-belt 30 comprises a plurality of ranks or sets 32 of links 34 interleaved with adjacent sets of links 36 also made up of links 34. Sets 32 contain one more link than sets 36 because they include the outermost links of the chain. Each link has a pair of spaced apertures 38 adjacent its ends with the apertures at one end of the links meshing with the aligned apertures of the interleaved set of links. A pivot means 40, shown as round pin, is received in the aligned apertures to connect the sets of links together and to permit articulation of chain-belt 30. Other types of pivot means, such as pins and rockers, known in the art, can be used to connect the sets of links.

Means are provided in the form of load block assemblies 44 to drivingly engage flanges 22, 24 and 26, 28 of pulleys 12 and 14, respectively (see FIGS. 1 and 2). Each load block 44 surrounds a set of links and is positioned between adjacent pivot means 40. Each load block assembly 44 is illustrated as being formed of three plates 44A, 44B and 44C, and has a generally rectangular central opening or window 46 permitting it to be assembled with the links of a set. Each plate has angled side edges 48 (only one edge being shown) for drivingly engaging the pulley flanges, giving each block a trapezoidal appearance when viewed from the front or rear. At times, load blocks, such as those described, are referred to as being generally "V-shaped". While being shown as constructed of three plates, each load block assembly 44 could be a single member, or constructed of two plates, or more than three plates.

Figure 4:
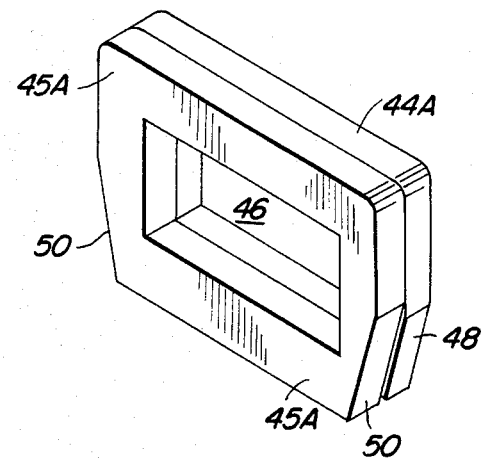
FIG. 4 is an isometric view of a pair of load blocks usable in the chain-belt of FIG. 3 which have been placed face-to-face with one another to show their different widths.

According to a preferred embodiment of this invention, as illustrated in FIG. 3, at least one non-load block assembly, identified as 45 and constructed of plates 45A, 45B and 45C, is used in the chain assembly. The block 45 is not a load block because the edge surfaces 50 of plates 45A, 45B and 45C do not contact the pulley flanges. The width of block 45, where it contacts the pulley flange, is less than the width of each load block 44. To illustrate this difference in flange-engaging dimensions, FIG. 4 shows load block plate 44A and block plate 45A. Plate 45A is narrower than load block plate 44 at its edge surfaces 50; edge surfaces 50 of plate 45A are such as not to contact the pulley flanges. Thus, in the chain-belt of FIG. 3, surfaces 50 of block 45 do not drivingly contact the flanges of the pulleys in operation of the transmission, whereas surfaces 48 of load blocks 44 drivingly contact the pulley flanges.

Figure 5:
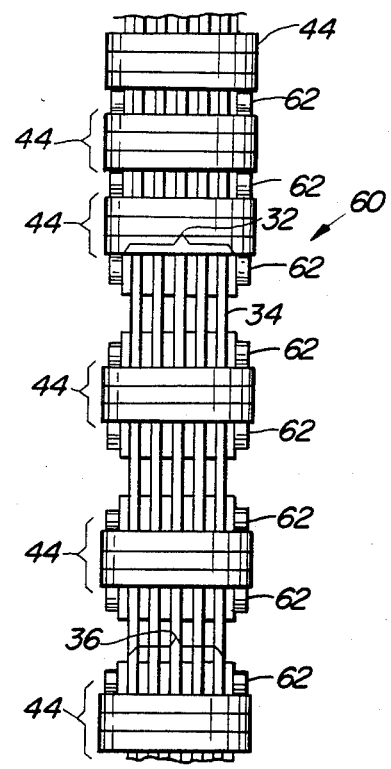
FIG. 5 is an isometric illustration of a portion of another form of chain-belt constructed according to this invention.

FIG. 5 illustrates a second embodiment of this invention in which chain-belt 60 is constructed with no load blocks between some of the adjacent pivot means 62. This arrangement is referred to as a "skip" block arrangement. The remainder of the chain-belt is the same as before described, and the same reference characters are used in FIG. 5 to refer to like parts. The effect on the noise pattern during operation in driving the pulleys of a pulley transmission is substantially the same as that for the FIG. 3 embodiment.

Generally, the load blocks, the links, and the pivot means are made of metal; for example, various types of steel. The pivot means are usually manufactured of a higher carbon steel than the load blocks, which in turn are of a higher carbon steel than the chain links. The pivot means are usually heat treated to increase their strength. The chain links and the load blocks can be stamped from sheet metal using known stamping techniques. The pivot means can be cut from a drawn metal shape. Each load block assembly can be a laminate of metal plates if desired.

The use of a chain-belt constructed according to the invention has been found to modify the noise pattern generated in previous variable pulley transmissions by the regular impact of the load blocks against the flanges of the pulleys, so that the noise is less objectionable to humans. The predominant frequency (f) of the noise generated by the impact of the load blocks against the pulley flanges is $$f = \frac{J}{P}$$

where J is the chain-belt velocity in feet/second, and P is a constant proportional to pulley engaging load block width.

By constructing a chain-belt according to this invention, P is no longer fixed. Thus there is no single-frequency noise which predominates in the noise spectrum; rather the noise spectrum includes sounds at more than one frequency, and the effect on the human ear is much less objectionable than when P is fixed.

It is known in the art that the pitch line (a line drawn through the centers of the successive pivot means) of a rigid link chain, as the chain articulates around a pulley, is polygonal rather than circular, and its engagement action is inherently one of impact with the pulley flanges. The path of the chain in relation to the pulley gives rise to what is termed "chordal action" i.e., the pitch line traverses a radial path as well as a longitudinal path as it enters the pulley. This "chordal action" gives rise to the undesirable noise peaks caused by the impact engagement action. The modifications taught by this invention in the presence or absence of blocks, or varying width of different drive blocks, change the pattern, especially with respect to timing, of the impact of the remaining load blocks with the pulley flanges and assist in modifying the ultimate noise pattern, so as to be less objectionable to the human ear.

When used herein and in the appended claims, the expression "load blocks" means a single block or a laminate of relatively thin parts, each load block, whether one piece or of multiple parts being located between a pair of adjacent pivot means which join the link sets together.

What is claimed is:

1. An endless chain-belt for drivingly connecting the pulleys of a pulley transmission, each pulley having a pair of flanges, comprising a plurality of sets of links interleaved with other sets of links, each link having a pair of spaced apertures, the apertures in one set of links being transversely aligned with the apertures of the next adjacent set of links which is interleaved therewith to form groups of aligned apertures, pivot means positioned in each group of aligned apertures to both join said sets of links and to permit articulation of the chain-belt, and contacting means surrounding sets of links and carried on the chain-belt for drivingly contacting the flanges of said pulleys, said contacting means surrounding only some sets of links and located between adjacent pivot means.

2. A chain-belt as recited in claim 1, wherein said means for drivingly contacting the pulley flanges comprise generally trapezoidal load blocks having angled edge surfaces for flange contact.

3. A chain-belt as recited in claim 2, further comprising an additional load block surrounding at least one other set of links and located between a pair of adjacent pivot means, said additional block being generally trapezoidal with angled edge surfaces dimensioned to be free of contact with said pulley flanges.

4. A chain-belt as recited in claim 3, and further comprising a plurality of said additional blocks, randomly located in said chain-belt.

5. A chain-belt for drivingly connecting the pulleys of a pulley transmission, each pulley having a pair of frusto conical flanges, said chain-belt comprising a plurality of sets of links interleaved with other sets of links, each link having a pair of spaced apertures, the apertures in one set of links being transversely aligned with the apertures in the next adjacent set of links which is interleaved therewith to form groups of aligned apertures, pivot means positioned in each group of aligned apertures to join said sets of links and to permit articulation of the chain-belt, and a generally trapezoidal-shaped load block having angled edge surfaces adapted to drivingly contact the flanges of said pulleys and transversely surrounding some sets of links and positioned between the adjacent pivot means, at least one set of links being free of a load block.

6. An endless chain-belt for drivingly connecting the pulleys of a pulley transmission, each pulley having a pair of flanges, comprising a plurality of sets of links interleaved with other sets of links, each link having a pair of spaced apertures, the apertures in one set of links being transversely aligned with the apertures of the next adjacent set of links which is interleaved therewith to form groups of aligned apertures, pivot means positioned in each group of aligned apertures to both join said sets of links and to permit articulation of the chain-belt, means comprising generally trapezoidal load blocks having angled edge surfaces carried on the chain-belt for drivingly contacting the flanges of said pulleys, said means surrounding only some sets of links and located between adjacent pivot means, and an additional load block surrounding at least one other set of links and located between a pair of adjacent pivot means, said additional block being generally trapezoidal with angled edge surfaces dimensioned to be free of contact with said pulley flanges, said angled surfaces of said additional block being ground so that the width thereof is less than the remainder of said load blocks.

* * * * *